United States Patent
Guan et al.

(10) Patent No.: US 8,510,547 B2
(45) Date of Patent: *Aug. 13, 2013

(54) POWER REDUCTION FOR SYSTEM ON CHIP

(75) Inventors: Teck Ee Guan, Selangor (MY); Kai Hoong Fong, Penang (MY)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/168,404

(22) Filed: Jun. 24, 2011

(65) Prior Publication Data

US 2011/0258469 A1    Oct. 20, 2011

Related U.S. Application Data

(63) Continuation of application No. 11/717,296, filed on Mar. 13, 2007, now Pat. No. 7,991,992.

(51) Int. Cl.
*G06F 1/32* (2006.01)

(52) U.S. Cl.
USPC ............ 713/100; 713/300; 713/320; 327/178

(58) Field of Classification Search
USPC .......................... 713/100, 300, 320; 327/178
See application file for complete search history.

(56) References Cited

U.S. PATENT DOCUMENTS

| | | | |
|---|---|---|---|
| 5,546,591 A | 8/1996 | Wurzburg et al. | |
| 5,789,952 A | 8/1998 | Yap et al. | |
| 5,887,179 A | 3/1999 | Halahmi et al. | |
| 6,272,644 B1 | 8/2001 | Urade et al. | |
| 6,785,826 B1 | 8/2004 | Durham et al. | |
| 7,178,044 B2 | 2/2007 | Pappalardo et al. | |
| 7,696,641 B2 | 4/2010 | Tomita | |
| 7,991,992 B2 * | 8/2011 | Guan et al. ............ | 713/100 |
| 2002/0016904 A1 | 2/2002 | Chrysanthakopoulos | |
| 2002/0135398 A1 | 9/2002 | Choi et al. | |
| 2003/0200470 A1 * | 10/2003 | Yamada .................. | 713/300 |
| 2004/0043800 A1 | 3/2004 | Hosoi | |
| 2006/0047988 A1 * | 3/2006 | Okada ..................... | 713/323 |
| 2006/0128349 A1 | 6/2006 | Yoon | |
| 2006/0184812 A1 | 8/2006 | Nguyen et al. | |
| 2007/0085583 A1 | 4/2007 | Zohar | |
| 2008/0168285 A1 * | 7/2008 | de Cesare et al. ...... | 713/320 |
| 2008/0197703 A1 | 8/2008 | Tomita | |

* cited by examiner

*Primary Examiner* — Vincent Tran
(74) *Attorney, Agent, or Firm* — International IP Law Group, P.L.L.C.

(57) ABSTRACT

Disclosed herein are SOC devices with peripheral units having power management logic.

12 Claims, 5 Drawing Sheets

200

200

400 under a first aspect of the invention, power
POWER REDUCTION FOR SYSTEM ON CHIP

CROSS-REFERENCE TO RELATED APPLICATION

This application is a Continuation of U.S. patent application Ser. No. 11/717,296, Filed on Mar. 13, 2007, and entitled "POWER REDUCTION FOR SYSTEM ON CHIP". This application is incorporated herein by reference in its entirety.

BACKGROUND

System-on-chip (SOC) integrated circuits are becoming ever more popular in various applications including embedded applications such as with set-top-boxes, mobile phones, portable media devices, and so on. Especially with portable SOC applications, power management functionality may be a desired aspect of many SOC implementations. One way to reduce power consumption is to control the clocks provided to peripherals in an SOC by slowing them down or turning them off dynamically when feasible.

FIG. 1 shows a typical power management implementation in an SOC. The depicted SOC portion has a core 101, clock control logic 102, power management logic 104, and peripherals 106 (e.g., graphics controller, universal serial bus client, universal asynchronous receiver/transmitter, and the like). The power management logic 104 typically has a timer to monitor system events indicating the state of a peripheral. When events indicate that a peripheral has a lack of activity for a period of time, the power management logic sends a request to the peripheral to enter it into a power saving state. The peripheral then responds by sending an acknowledge signal. This handshaking is typically necessary to avoid uncompleted, pending transfers or tasks (e.g., pending FIFO or bus transfers). When the power management logic receives the acknowledge signal, indicating that the peripheral is ready to go into a power reduction state, it gates off or slows down the clock provided to the peripheral. This is typically implemented via the clock control logic 102. Unfortunately, such schemes may have some drawbacks and thus, a new approach may be desired.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
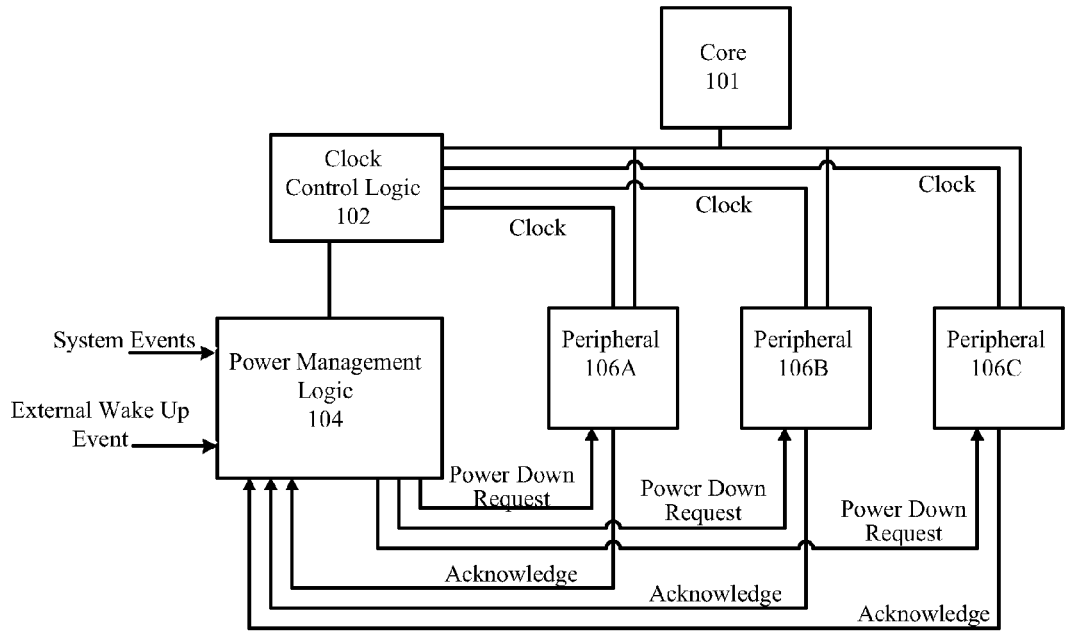
FIG. 1 is a diagram of a portion of a conventional system-on-chip (SOC).
Figure 2:
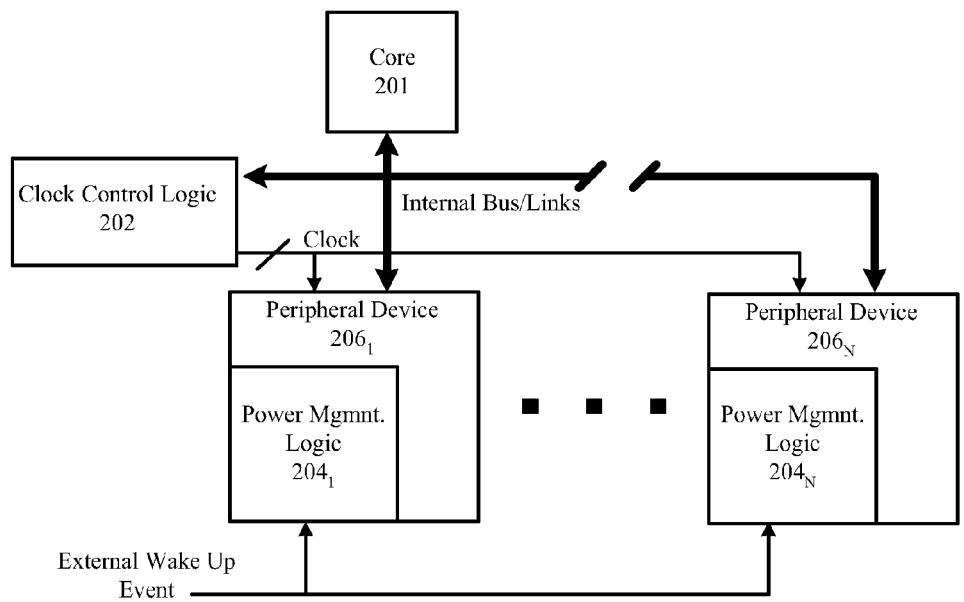
FIG. 2 is a diagram of a portion of an SOC in accordance with some embodiments.

FIG. 2 shows a portion of a system-on-chip (SOC) device 200 utilizing a novel power management scheme in accordance with some embodiments. It comprises a core 201, clock control (CC) logic 202, and peripheral units $206_1$ through $206_N$. (for brevity sake and convenience, not all blocks or elements of an SOC implementation are shown.) They are communicatively coupled to one another, as shown, with the actual communication links being implemented with an internal bus and/or direct (block-to-block) links, depending on the needs and concerns for a given design. The peripheral units $206_i$ may include but are not limited to digital-to-analog converters (DACs), universal asynchronous receiver transmitters (UARTs), graphics controllers, timers, memory controllers such as double data rate 2 (DDR2) communications link controllers such as Ethernet controllers, peripheral chip interconnect (PCI) controllers, universal serial bus (USB) controllers, and the like.

The CC logic 202 is coupled to the peripheral devices to provide them with separately controllable clock signals. Each peripheral unit $206_i$ has a power management logic unit (or power management logic) $204_i$ to monitor its associated peripheral unit. It monitors relevant conditions to determine if its peripheral unit may be placed into a reduced power state. While any appropriate method for reducing power in a peripheral (e.g., reducing supply power in all or part of the peripheral) is contemplated, an approach involving reducing the applied clock will primarily be used as an example of an appropriate power reducing methodology for this description. (Reducing the clock refers to shutting down, slowing down, and/or reducing its magnitude, as it is applied to a peripheral unit for which power is to be reduced.)

The power management logic 204 may use any suitable criteria to determine if its peripheral unit may or should be placed in a power reduction state. For example, it could have a timer to "time" periods of inactivity and determine that the peripheral should be placed in the power reduction state if a sufficient amount of inactive time has elapsed. It could also monitor states external to the peripheral to respond to different SOC power-reducing states such as so-called sleep modes or the like.

Figure 3:
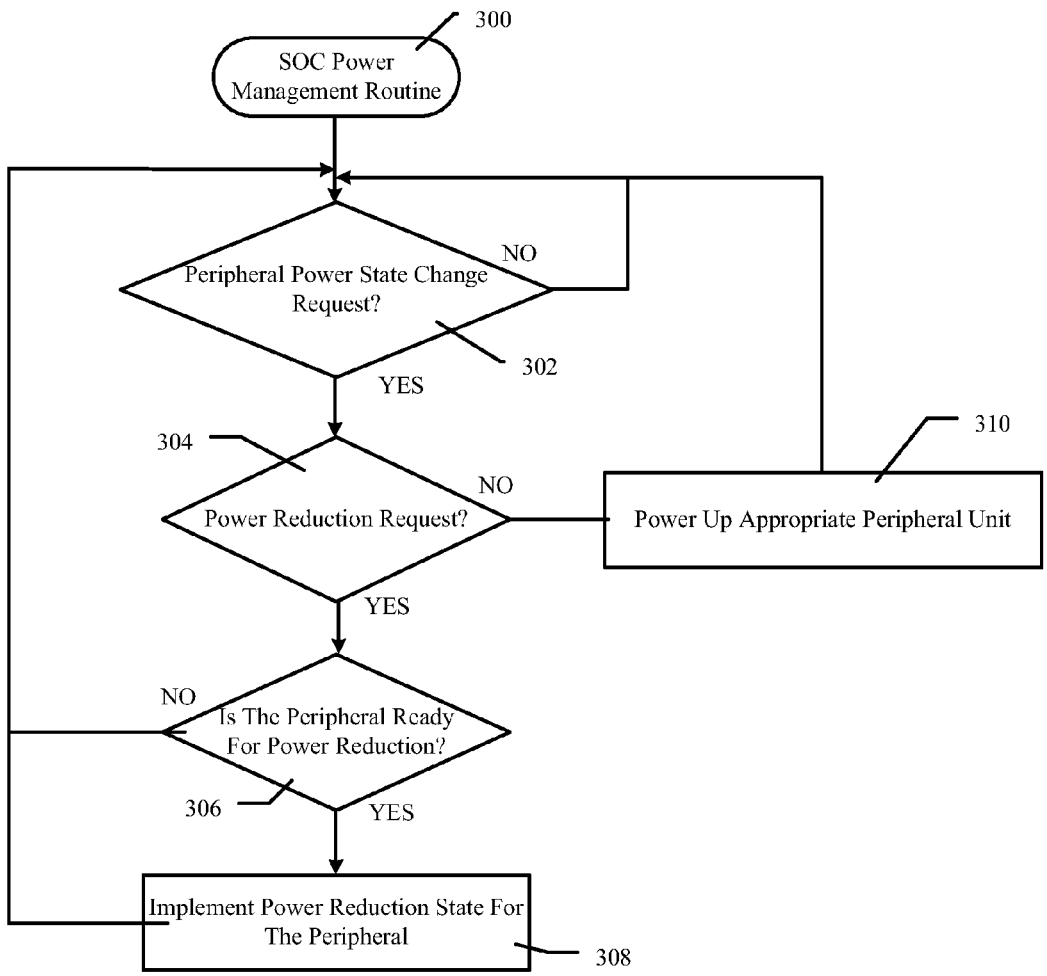
FIG. 3 is flow diagram showing a power management routine for an SOC in accordance with some embodiments.

FIG. 3 shows an exemplary routine 300 for implementing power management in an SOC such as SOC 200 of FIG. 2. At 302, the core 202 determines if a power state change for a peripheral should occur. This could come from power management logic in a peripheral (e.g., detecting sufficient inactivity to warrant power reduction or receiving an external event such as from a USB device attempting to communicate with the SOC), or it could come from the core itself. If a power state change is not to occur, then the routine loops back upon itself at 302.

Otherwise, if it determines that a state change is to occur, then at 304, it determines if the state change is for power reduction. If not, i.e., the request is to power up a peripheral, then at 310, it powers back up the appropriate peripheral unit, and loops back to 302. Otherwise, at 306, it determines if the peripheral is ready for power reduction. This could occur in many different ways. For example, in an embodiment discussed below, it could check a ready bit in the power management logic of the peripheral. If the peripheral is ready, then at 308, power reduction is implemented for the peripheral, and the routine again loops back to 302.

Figure 4:
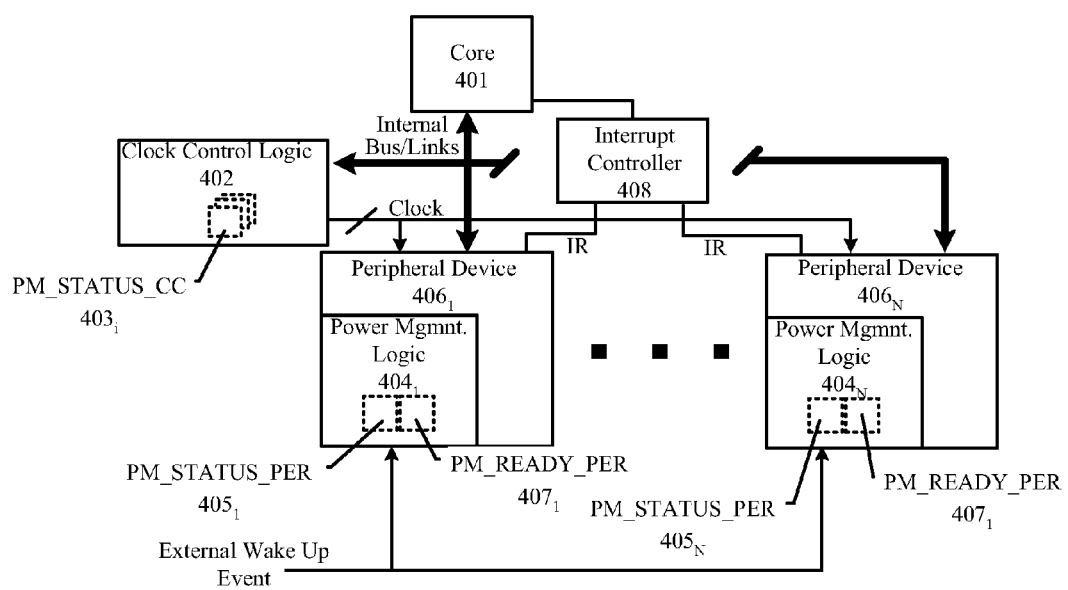
FIG. 4 is a diagram of a portion of a more particular implementation of an SOC in accordance with some embodiments.

FIG. 4 shows a more particular embodiment 400 of the SOC 200 from FIG. 2. It's similar to SOC 200 except that it uses an interrupt controller 408 to implement power state change requests from power management logic units 404$_i$. It also uses mirrored status bits (PM_STATUS_PER 403$_i$ and PM_STATUS_CC 405$_i$) in the clock control logic 402 and power management logic units 404$_i$, respectively, and it employs a ready bit (PM_READY_PER 407$_i$) in the power management units. As used herein, the term mirrored refers to corresponding status bits in the CC logic and a power management logic unit reflecting (or tracking) each other. This could be implemented in several different ways. For example, corresponding bits (e.g., PM_STATUS_CC 403$_2$ and PM_STATUS_PER 405$_2$) could be hard-coupled (e.g., common their data input/output lines coupled together or configured with a circuit so that they have the same value) or this could be done through software. Table I shows exemplary functional descriptions for these bits.

TABLE I

Register Bit Descriptions

| Register Bit | Description | Value | Indication |
|---|---|---|---|
| PM_STATUS_CC | In Clock Control Logic. Has the same value with PM_STATUS_PER. Clearing this bit will turn off or slow down the clock to peripheral. | 0 | Peripheral entered into power down state. Clock is slowed down or turned off. |
| | | 1 | Peripheral is ON and in normal operating state. Clock runs at normal frequency. |
| PM_STATUS_PER | In Peripheral's Power Management Logic. Indicates peripheral already in power saving state, ie. Clock is off/slow down. | 0 | Peripheral entered into power reduced state. |
| | | 1 | Peripheral is ON or in normal operating state. |
| PM_READY_PER | In Peripheral's Power Management Logic. Indicates peripheral is ready to enter into power saving state after some inactivity time. | 0 | Peripheral NOT ready for power reduction. |
| | | 1 | Peripheral READY to request for power reduction. |

Note that the core can control a peripheral'[s clock by controlling the peripheral's associated CC status bit to control the clock for the associated peripheral. That is, it can reduce a peripheral's clock by clearing (to '0) its associated CC status bit or it can power it back up by setting (to '1) its associated CC status bit. In addition, in this embodiment, the interrupt control functionality available in many SOC designs is used to allow the power management logic in each peripheral to request power state changes from the core.

Figure 5:
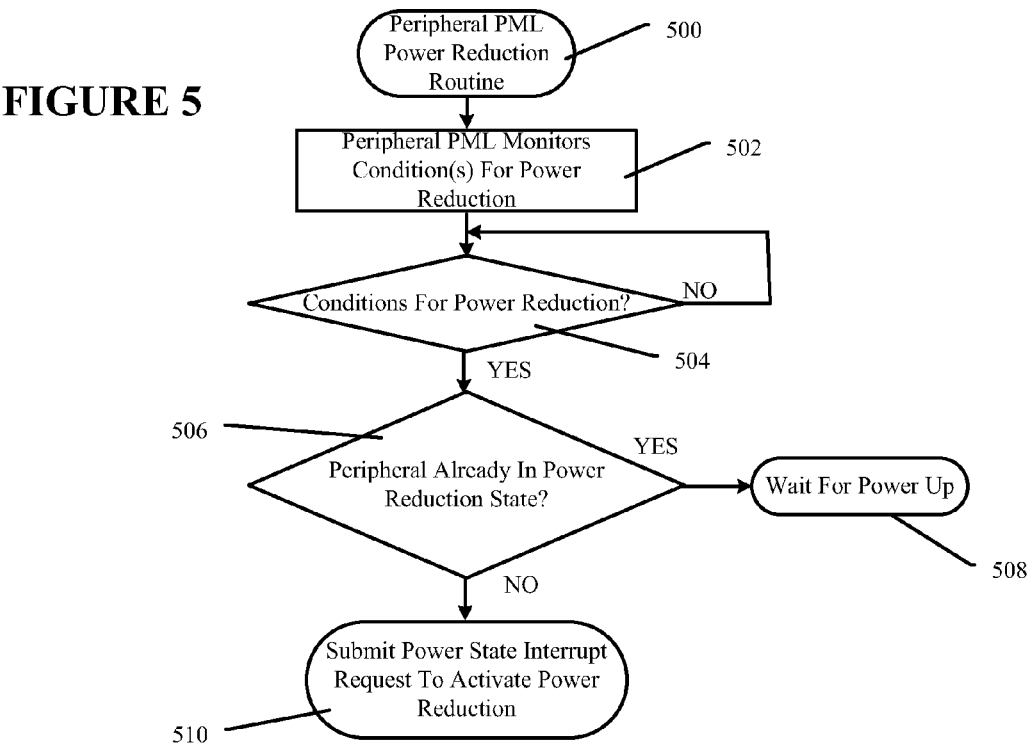
FIG. 5 is a flow diagram of a power reduction routine for power management logic in an SOC peripheral in accordance with some embodiments.

FIG. 5 shows an exemplary power reduction routine 500 to be implemented by a power management logic unit in a peripheral unit. At 502, the power management logic monitors condition(s) warranting a power reduction for its associated peripheral unit. For example, such condition(s) could involve peripheral inactivity or it could comprise an external event from within or outside of the SOC. At 504, it determines if conditions are satisfied for power reduction. If not k, then the routine loops back upon itself at 504 to continue to look for appropriate power reduction conditions. On the other hand, if the conditions are appropriate for power reduction, then at 506 it determines if the peripheral is already in a power reduction state. For example, it could check the PM-STATUS_PER bit to confirm that it is not yet in a power reduction state. If it is already in a reduced power state, then at 508, the routine terminates until the peripheral is powered back up. On the other hand, if it is not yet in a reduced power state, then at 510, it submits an interrupt request (e.g., to the interrupt controller) to be serviced by the core in order for the peripheral to be placed into a reduced power state.

Figure 6:
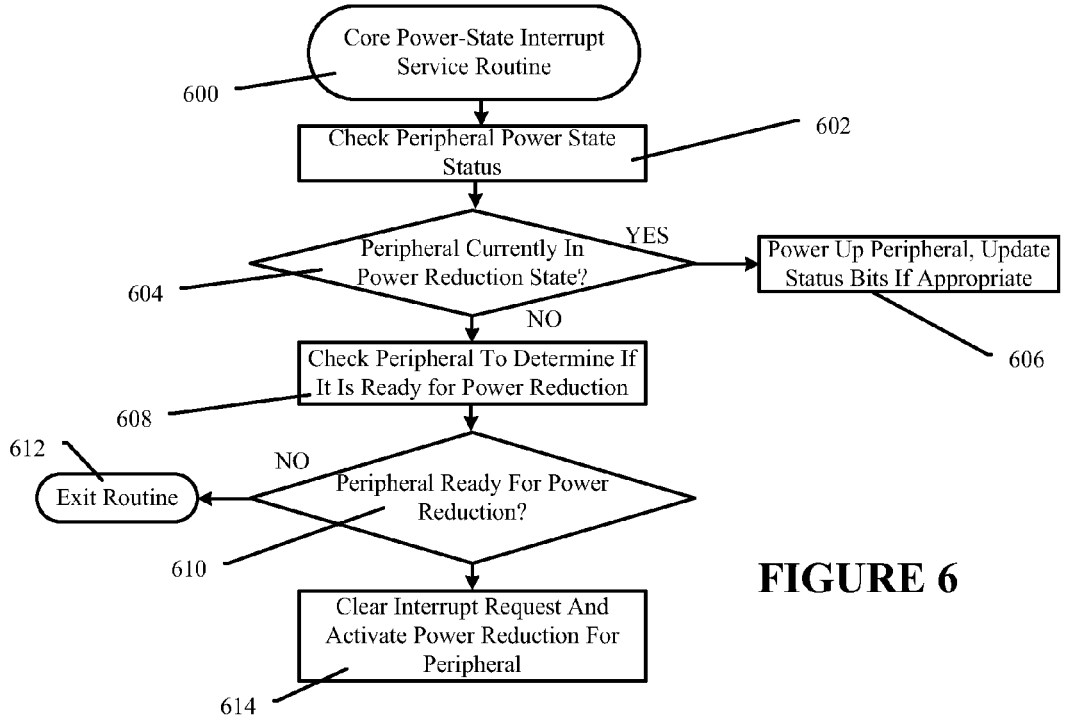
FIG. 6 is a flow diagram of a routine for a power mode interrupt service routine for a core in an SOC in accordance with some embodiments.

FIG. 6 shows an interrupt service routine 600 to be performed by the core to service a power-state change request from a peripheral. Upon receiving an power-state interrupt service request, at 602, the core checks the state of the requesting peripheral. At 604, it determines if the peripheral is in a reduced power state. If it is in a reduced power state, then at 606, it powers back up the peripheral, e.g., by setting the PM_STATUS_CC bit to '1, which also sets the status bit in the peripheral. By setting the CC logic status bit, it causes the clock control logic to provide to the peripheral a normal, operational clock.

At 604, if the peripheral is not currently in a reduced power state, then at 608, it checks the peripheral to determine if it is ready for power reduction. It does this by checking the PM_READY_PER bit to determine if it is asserted (e.g., '1). At 610, if it determines that the peripheral is not ready, then it exits the routine at 612. On the other hand, if the peripheral is ready, then at 614, it clears the interrupt request, initiates power reduction, and clears the ready bit (PM_READY_PER) in the peripheral. (Clearing the ready bit may be the same as clearing the interrupt request in some embodiments.)

Figure 7:
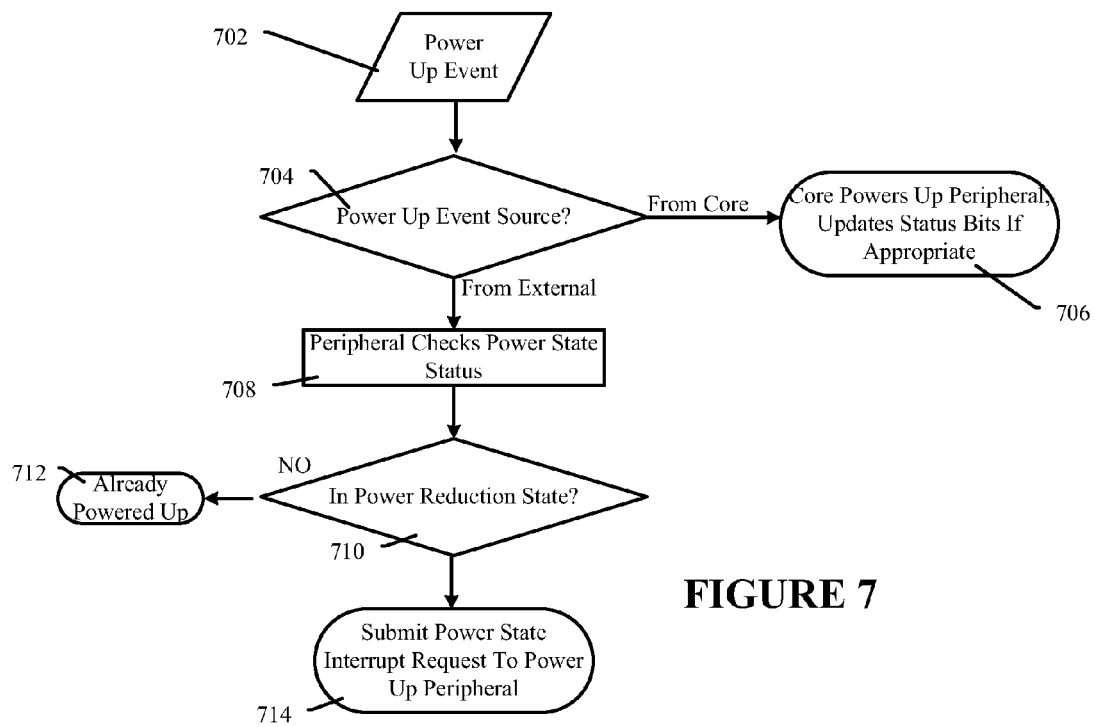
FIG. 7 is a flow diagram illustrating how power up may be handled in a power management scheme for an SOC in accordance with some embodiments.

FIG. 7 is a flow diagram showing how a peripheral, in a power reduced mode, may be powered back up. At 704, the source of a power up event 702 is determined. If it is initiated by the core, than the core simply powers back up the peripheral (e.g., by setting the PM_STATUS_CC bit) in the clock control logic) and updates status bits if appropriate (e.g., it might update the status bit in the peripheral's power management logic if not linked with the status bit in the clock control logic, as is the case with the embodiment of FIG. 4). Otherwise, if it is an external power up request (i.e., coming from the peripheral), then at 706, the peripheral checks its power state. At 710, it determines if it is currently in a reduced power state. If not, then at 712, it doesn't have to do anything with the peripheral already being powered up. On the other hand, if it is not yet powered up, then at 714, it submits a power state interrupt request to be processed by the core (e.g., with the routine of FIG. 6).

Figure 8:
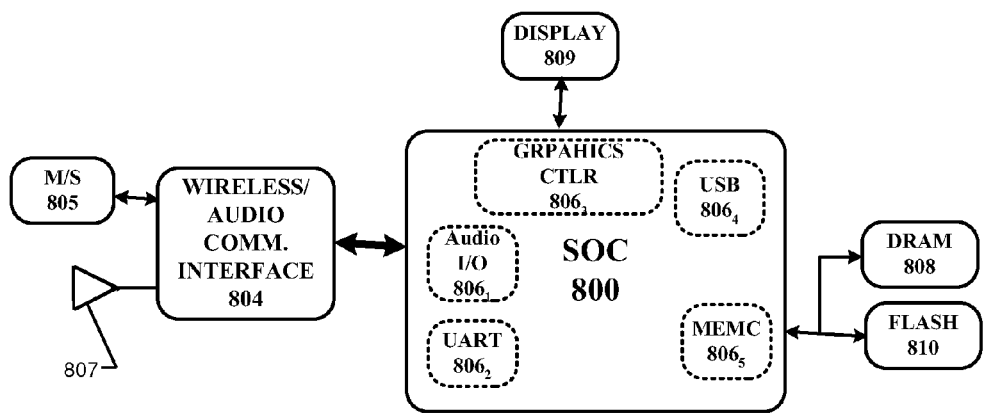
FIG. 8 shows a portion of a block diagram for a wireless device with an SOC in accordance with some embodiments.

FIG. 8 shows an example of an application, a wireless communications device, for an SOC discussed herein. It generally comprises an SOC 500 (such as the SOC of FIG. 2 or 4), a wireless audio communications interface 804, microphone/speaker module 805, antenna 807, display device 809, dynamic random access memory (DRAM) 808, and flash memory 810, coupled together as shown. The SOC includes various peripheral units including an audio I/O controller 806$_1$, UART 806$_2$, graphics controller 806$_3$, USB controller 806$_4$, and memory controller 806$_5$, to communicatively and controllably link the various external devices to the SOC core, direct memory access (DMA) controller and/or other relevant SOC blocks for desired operation. The peripheral units 806$_i$ each comprise a power management logic unit to implement power reduction as discussed above.

The invention is not limited to the embodiments described, but can be practiced with modification and alteration within the spirit and scope of the appended claims. Moreover, it should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS. for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. A system-on-a-chip integrated circuit, comprising:
a processor core;
a peripheral unit communicatively coupled to the processor core, the peripheral unit comprising power management logic to determine when the peripheral unit may go into a power reduction state and to request entry into the power reduction state; and
a clock provided to the peripheral unit, the clock comprising clock control logic coupled between the processor core and the peripheral unit to provide the clock to the peripheral unit, wherein the clock control logic comprises a power mode status bit for the peripheral unit to indicate if the peripheral unit is in the power reduction state, wherein the power management logic comprises a separate power mode status bit that mirrors the power mode status bit in the clock control logic, and wherein the processor core causes the clock to be reduced in servicing the power reduction request through control of the power mode status bit.

2. The integrated circuit of claim 1, comprising an interrupt controller to receive the power reduction request and provide the power reduction request to the processor core to service the power reduction request.

3. The integrated circuit of claim 2, in which the peripheral unit is coupled to the processor core via an internal bus.

4. The integrated circuit of claim 1, in which the power mode status bits in the clock control logic and the power management logic are hard coupled to one another.

5. A method, comprising:
within an SOC, receiving a power reduction request from a peripheral unit generated by power management logic within the peripheral unit; and
sending a signal to cause power consumption in the peripheral unit to be reduced in response to the power reduction request, wherein power consumption is to be reduced by reducing a clock provided to the peripheral unit, the clock comprising clock control logic to provide the clock to the peripheral unit, wherein the clock control logic comprises a power mode status bit for the peripheral unit to indicate if the peripheral unit is in the power reduction state, wherein the power management logic comprises a separate power mode status bit that mirrors the power mode status bit in the clock control logic, and wherein the clock is reduced through control of the power mode status bit.

6. The method of claim 5, wherein receiving the power reduction request comprises receiving an interrupt service request from the peripheral unit through an interrupt controller.

7. The method of claim 6, comprising determining that the peripheral unit is ready for power reduction before sending the signal to cause power consumption to be reduced.

8. The method of claim 7, wherein determining that the peripheral unit is ready for power reduction comprises checking a ready bit within the power management logic.

9. A wireless communications device, comprising:
an SOC comprising a processor core, a peripheral unit communicatively coupled to the processor core, the peripheral unit having power management logic to determine when the peripheral unit may go into a power reduction state and to request entry into the power reduction state, and a clock provided to the peripheral, the clock comprising clock control logic coupled between the processor core and the peripheral unit to provide the clock to the peripheral unit, wherein the clock control logic comprises a power mode status bit for the peripheral unit to indicate if the peripheral unit is in the power reduction state, wherein the power management logic comprises a separate power mode status bit that mirrors the power mode status bit in the clock control logic, and wherein the processor core causes the clock to be reduced in servicing the power reduction request through control of the power mode status bit;
an antenna coupled to the processor core through a wireless interface; and
a serial communications interface coupled to the processor core through the peripheral unit.

10. The device of claim 9, in which the SOC further comprises an interrupt controller to receive the power reduction request and provide the power reduction request to the processor core to service the power reduction request.

11. The device of claim 10, in which the peripheral unit is coupled to the processor core via an internal bus.

12. The device of claim 9, in which the peripheral unit comprises a USB controller.

* * * * *